Aug. 22, 1939.  J. B. MOORE  2,170,593
BRAKE CONTROL MECHANISM
Filed Oct. 7, 1936   3 Sheets-Sheet 1

Joseph B. Moore
INVENTOR
BY Victor J. Evans & Co.
ATTORNEYS

Aug. 22, 1939.  J. B. MOORE  2,170,593
BRAKE CONTROL MECHANISM
Filed Oct. 7, 1936  3 Sheets-Sheet 2
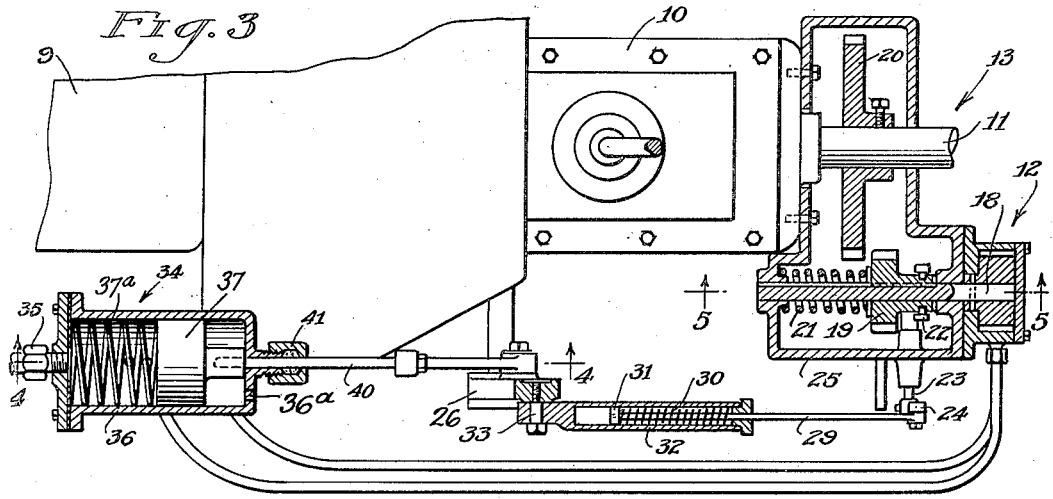
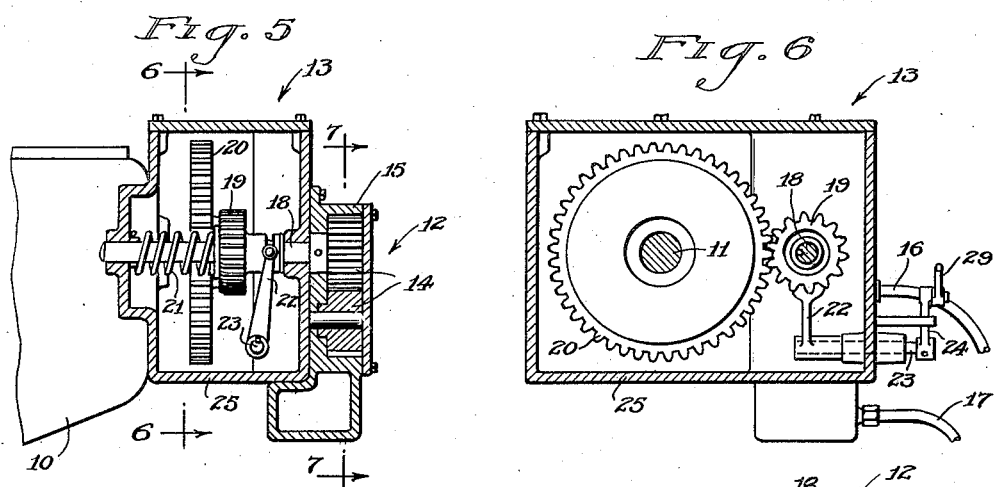
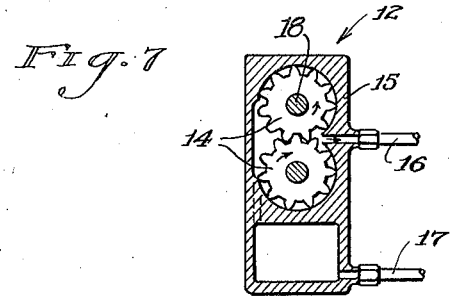
Joseph B. Moore
INVENTOR
BY Victor J. Evans & Co.
ATTORNEYS Aug. 22, 1939.    J. B. MOORE    2,170,593
BRAKE CONTROL MECHANISM
Filed Oct. 7, 1936    3 Sheets-Sheet 3

Fig. 8

Joseph B. Moore
INVENTOR
BY Victor J. Evans & Co.
ATTORNEYS

Patented Aug. 22, 1939

2,170,593

UNITED STATES PATENT OFFICE 2,170,593

BRAKE CONTROL MECHANISM

Joseph B. Moore, Madawaska, Maine

Application October 7, 1936, Serial No. 104,520

4 Claims. (Cl. 188—152)

The present invention relates to vehicle brake systems and more particularly to the control mechanism for the application of hydraulic brakes.

The primary object of the invention is to provide a control mechanism for hydraulic brakes adapted for sensitive and positive control of the brakes, the operation of which requires a minimum of physical effort on the part of the operator in applying the brakes.

A further object of the invention is to provide a control device for hydraulic brakes in combination with a source of fluid pressure, the novel arrangement of the apparatus providing for the actuation of the vehicle's brakes when the vehicle is traveling so that an adequate braking power can be provided independently of the speed of travel.

Another object resides in the provision of a hydraulic brake control system comprising in combination a control mechanism for the automatic application of the brakes and auxiliary operating mechanism permitting manual application of the brakes to supplement or operate independently of the automatic brake control.

Another object of the invention is to provide a brake control mechanism comprising, in combination, means for effecting the initial actuation of a vehicle's brakes either by a hand operated lever or a foot pedal, either controlling element being at the convenient disposal of the operator.

The invention will be fully and comprehensively understood from a consideration of the following detailed description when read in connection with the accompanying drawings which form part of the application.

In the drawings:

Fig. 3 is an enlarged plan view illustrating the control mechanism in section taken on line 3—3 of Fig. 2.

Fig. 5 is a vertical sectional view taken on line 5—5 of Fig. 3 illustrating the preferred arrangement for the generation of brake fluid pressure.

Fig. 6 is a transverse sectional view on line 6—6 of Fig. 5.

Fig. 7 is a transverse sectional view taken on line 7—7 of Fig. 5; and

Fig. 8 is a side elevational view similar to Fig. 2 but illustrating a modified arrangement of the invention, portions thereof being broken away in central section.

Figure 1:
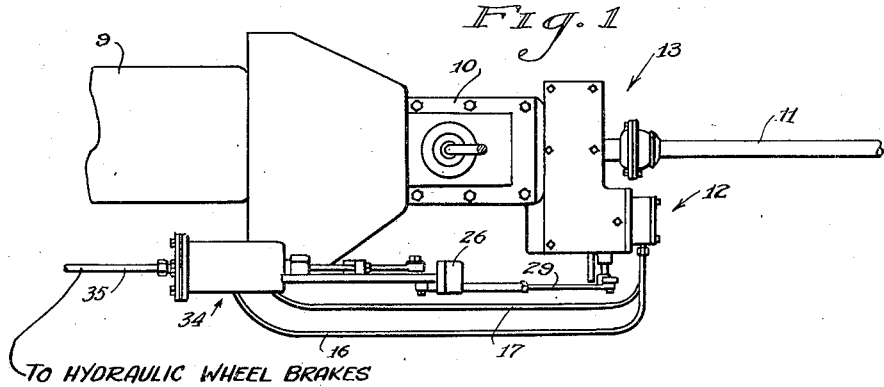
Figs. 1 and 2 are plan and side elevational views, respectively, of the preferred embodiment of the invention.

In the physical embodiment of the invention illustrated in the drawing the brake control mechanism is illustrated for use on the conventional type of motor vehicle now in common use and comprising a motor 9 for propelling the vehicle thru a selective speed transmission 10 by which the wheels of the vehicle are rotated thru a propeller or jack shaft 11.

Briefly stated, the invention comprises the novel combination of a suitable source of fluid pressure generated during travel of the vehicle, piping for application of the fluid pressure to the vehicle's hydraulic brakes and control mechanism interposed between the fluid pressure source and the hydraulic brakes whereby the brakes may be applied at the will of the operator.

It will be apparent after a detailed description of the brake control mechanism is had that any suitable source of fluid pressure may be employed in the actuation of the hydraulic brakes. Preferably, the pump 12 and drive means 13 are employed, the same being illustrated in detail in Figs. 3, 5, 6 and 7. The pump 12, see Fig. 7, is of the usual gear type comprising a pair of intermeshed gears 14 encased in a suitable housing 15, the housing being provided with a supply pipe 16 and an intake pipe 17. One of the gears 14 is rotated by the drive mechanism 13, the shaft 18 of the mentioned gear being extended to carry a pinion gear 19 axially slidable thereon. The pinion gear 19 is arranged to slide into mesh with a driving gear 20, the latter being fixed to a portion of the propeller shaft 11 extending from the selective transmission 10 of the vehicle. The pinion gear 19 is normally out of mesh with the driving gear 20, being urged to this position by a spring 21 surrounding the shaft 18. The gear 19 is shifted into mesh against the pressure of spring 21 by actuation of a forked arm 22, the free end of which engages in a circumferential groove cut in the hub of the gear 19. The arm 22 is fixed to a shaft 23, the same being actuable by a lever arm 24. The shaft 23 is journalled in a housing 25 encasing the entire drive mechanism 13, the housing being suitably carried on the casing of the transmission 10.

In the preferred form of the invention, the operation of the brake control mechanism is preferably effected by the actuation of the brake pedal 26, the same being pivotally mounted on a shaft 27 and held normally in ineffective position by means including a spring 28. An initial movement of the brake pedal 26 effects the shifting of the pinion gear 19 into mesh with the driving gear 20, the movement of the pedal 26 being transmitted thru a link 29 to the lever arm 24. To avoid damage to the gears 19 and 20 during meshing, the link 29 is resiliently connected to the pedal 26 as by a compression spring 30 engaging a collar 31 at the end of the link 29, the spring 30 being encased in a tube 32 pivotally secured to the pedal 26 by a stud 33.

Figure 2:
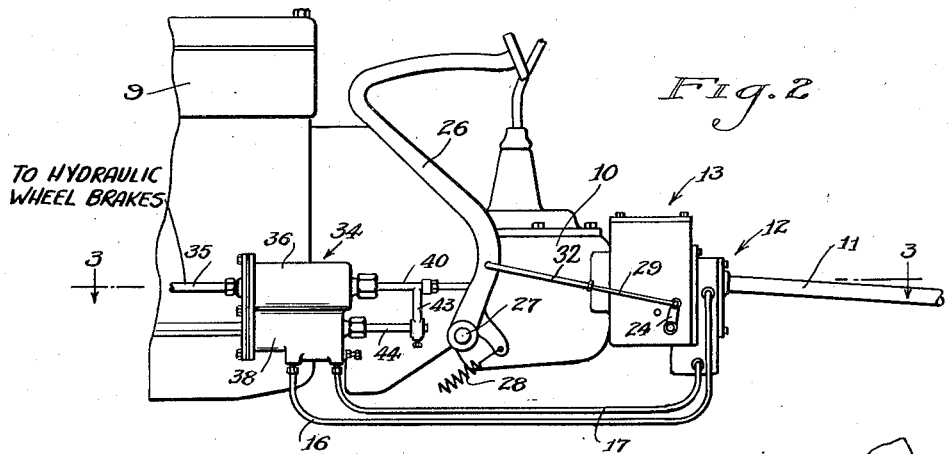
Figure 4:
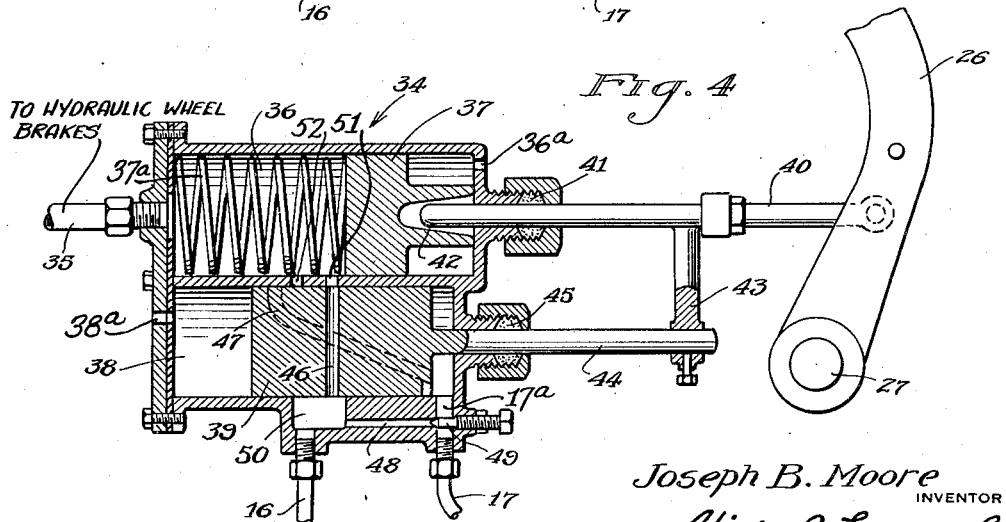
Fig. 4 is a vertical sectional view, with parts in elevation, of the brake cylinder and control valve for same taken on line 4—4 of Fig. 3.

The apparatus thus far described provides for the generation of a pressure fluid for the operation of a vehicle's hydraulic brakes, the flow of the hydraulic fluid under pressure being controlled by the mechanism illustrated in detail in Fig. 4. It will be noted by reference to Figs. 1 and 2 that the supply pipe 16 and the intake pipe 17 both issuing from the pump 12 are connected to the control mechanism 34 and as such constitute a source of fluid under pressure, the control mechanism 34 functioning to direct the fluid to the hydraulic brakes of the vehicle via a distributing pipe 35. It is to be noted here that the wheels of the vehicle are equipped with the usual hydraulic brakes well known in the art and that the pipe 35 functions to distribute the brake fluid to each of the mentioned hydraulic brakes.

The control apparatus 34 comprises mainly a brake cylinder 36 having a piston 37 slidable therein and a valve cylinder 38 having a valve 39 slidable therein. The cylinders 36 and 38 are provided with breather vents 36a and 38a to facilitate movement of the piston elements therein. During the application of the vehicle brakes the piston 37 and the valve 39 are actuated by movement of the brake pedal 26 thru a connecting rod 40. The piston 37 is normally positioned in the cylinder 36 substantially as shown in Fig. 4, being resiliently held in position by the spring 37a positioned between the piston face and the end of the cylinder. The rod 40 extends thru a gland 41 in the cylinder 36 to engage in a socket 42 formed in the piston 37 during depression of the brake pedal 26. The actuation of the valve 39 is effected by an arm 43 extending from the rod 40, the free end of the rod 43 being adjustably secured to a valve rod 44 carried on the valve 39, the rod 44 extending thru a gland 45 in a wall of the valve cylinder 38.

The valve 39 in its various positions, as controlled by the operation of the brake pedal 26, controls the supply of pressure fluid from the pipe 16 to the brake cylinder 36 and thence to the distributor pipe 35 and, as such, is provided with a supply port 46 and an exhaust port 47. It is to be noted here that to permit of continuous operation of the pump 12 a by-pass 48 is provided, the same communicating between the supply pipe 16 and the pump intake pipe 17. To assure adequate pressure of the brake fluid the by-pass 48 is adjustably obstructed by a needle valve 49 seating in the by-pass 48. By adjustment of the valve 49 the desired pressure of the brake fluid in the pipe 16 may be attained, any excess pressure being dissipated thru the valve 49 into the intake pipe 17. The supply port 46 is disposed diametrically in the valve 39, being in constant communication with a chamber 50 connected to the supply pipe 16. The function of the port 47 is to exhaust the pressure within the brake cylinder 36 and, as such, is directed from the periphery of the valve 39 adjacent the forward end thereof to the rear end of the valve 39 so as to communicate with the pump intake pipe 17.

The operation of the brake control mechanism in the application of the vehicle's hydraulic brakes will now be described. It is to be noted that the relation of the control apparatus 34, as illustrated in Fig. 4, is in position assumed after the initial operation of the brake pedal 26 and at the instant the brake fluid is applied to the brakes. When the brake lever 26 is depressed, the lever arm 24 connected thereto is moved in a counter-clockwise direction thereby causing the gears 19 and 20 to be meshed and operating the pump generally designated at 12. Simultaneously with these operations, the valve 39 is advanced within the cylinder 38 thereby moving the channel 47 out of alignment with ports 17a and 52 and positioning the channel 46 in alignment with the port 51 and the chamber 50. When so positioned, the pressure in the fluid in the chamber 50 is transmitted through 46—51—36—35 to the fluid body operating the hydraulic brakes thereby causing same to be applied. When the valve element 39 has been moved forward so that the channel 46 has passed the port 52, the chamber 36 is substantially sealed by the solid portion of the valve 39 obstructing the ports 51 and 52 so that no additional fluid can enter the chamber 36 from the pumping means and likewise no fluid can leave said chamber, except by the line 35 connected to the hydraulic wheel brakes.

The movement of the brake pedal 26 has not, up to this stage of operation, effected the piston 37 since the socket 42 is of such depth as to permit the initial movement of the rod 40. Should a further pressure be required to make the brakes more effective the brake pedal 26 may be further depressed so as now to move the piston 37, by which the brake fluid within the cylinder 36 may be further compressed to supplement the pressure generated by the pump 12.

Upon release of the brakes effective by retraction of the brake pedal 26 by means including the spring 28 the valve 39 is retracted so as to move the supply channel 46 past the port 51, whence the exhaust channel 47 moves into registry with the exhaust ports 52 and 17a, whereby the pressure on the vehicle's hydraulic brakes is thus vented into the intake pipe 17. Should a sudden stop of the vehicle be required it will be apparent that a quick and complete depression of the brake pedal 26 will instantly move the piston 37 to compress the brake fluid in the cylinder 36, which pressure is effective to apply the brakes in that both passages 51 and 52 have been closed by the previous movement of the valve 39.

Reference is now directed to Fig. 8 for a detailed description of the modified form of the brake control mechanism which provides for advance supply of the pressure brake fluid preparatory to the application of the brakes and, more particularly, permits of applying the brakes by hand as well as by foot pressure. In this instance a suitable source of brake fluid under pressure is also employed as embodied in the pump 12 and the drive mechanism 13. However, the pump 12 in this form is caused to be operated by an electric control system comprising a suitable battery 55 to deliver current to a solenoid 56, the core 57 of which is carried on the link 29 thereby shifting gear 19 into mesh with gear 20 to energize the pump 12.

It will be observed that the control apparatus 34 is employed, being similar in arrangement to that of the first form in that same comprises a brake cylinder 36 having piston 37 slidable therein and a valve cylinder 38 having the valve 39 slidable therein. The control unit 34 is arranged to receive the brake fluid under pressure via the pipes 16 and 17 as previously described and the brake piston 37 is arranged to be actuated by depression of the brake pedal 26 thru the rod 40.

In this form of the invention however the valve rod 44 is disposed to be operated independently of the brake piston rod 40 as well as to be operated coactively with the same. To accomplish this two-fold operation the arm 43 extending from the rod 40 is disposed to abut the free end of valve rod 44.

To provide for hand operation of the valve 39 independent of the brake pedal 26 a hand lever 58 is swingably mounted, preferably adjacent the steering wheel 59 of the vehicle on a bracket 60. The lever 58 is flexibly connected to a slide rod 61 extending preferably along the steering column 62 and is equipped at its lower end with a bell crank lever 63 flexibly engaging a link 64 for actuation of the valve rod 44. The free end of the rod 64 is provided with an arm 65 making a sliding engagement on the rod 44, which rod is equipped with a collar 66. Upon swinging the hand lever 58, the rod 64 is pulled so that its arm 65 engages the collar 66 to move the valve 39 forward to effect the turning on of the brake fluid as described in the first form, a return spring 67 being employed to effect the retraction of the valve 39. The lever 58 also functions to energize the pump 12 coactively with the advancement of the valve 39, in that the rod 61 is equipped with an electric contact arm 68 affixed thereon and disposed to engage a stationary contact 69 as the lever 58 is operated to move the valve 39. The contacts 68 and 69 are in circuit with the solenoid 56 and the battery 55.

By the arrangement of the invention illustrated in Fig. 8 the operator of the vehicle may apply the brakes by hand by operating the hand lever 58 to energize the pump 12 and coactively direct the brake fluid to the distributing pipe 35 by advancing the valve 39. The pump 12 may be energized in advance of applying the brakes since the contacts 68 and 69 are disposed to close prior to the actuation of the valve 39 since the arm 65 is normally spaced from the collar 66.

It will also be observed that the control apparatus illustrated in Fig. 8 permits of operating the vehicle's brakes also by the foot pedal 26, in which instance the arm 43 engaging the valve rod 44 directs the brake fluid into the distributing pipe 35 and thus applies the brakes. The application of the brakes may also be supplemented by actuation of the brake piston 37 during a further depression of the brake pedal 26 to increase the pressure of the brake fluid and thus accelerate the braking power.

It is to be understood that this improvement is capable of extended application and is not confined to the exact showing of the drawings nor to the precise construction described and, therefore, such changes and modifications may be made therein as do not affect the spirit of the invention nor exceed the scope thereof as expressed in the appended claims.

What is claimed as new is:

1. Apparatus for actuating hydraulic wheel brakes independently of the prime mover in a power driven vehicle comprising, means for supplying a fluid under pressure, means connected to said fluid pressure producing means and engageable with the free moving jack-shaft of said vehicle whereby said pressure producing means can be operated solely by momentum of the vehicle independently of the prime mover, valve means associated with said pressure producing means and simultaneously actuated when said connected means is actuated, said valve means including a cylinder and cooperating piston element and serving to conduct fluid from said pressure producing means to a pressure chamber, and an outlet from said pressure chamber connected to the hydraulic wheel brakes of the vehicle whereby said brakes can be actuated by the fluid pressure established as aforesaid.

2. Apparatus for actuating hydraulic wheel brakes independently of the prime mover in a power driven vehicle comprising means for supplying fluid under pressure including a gear pump, means connected to said fluid pressure producing means and engageable with the free moving jack-shaft of said vehicle whereby said pressure producing means can be operated solely by momentum of the vehicle independently of the prime mover, valve means associated with said pressure producing means and simultaneously actuated when said connected means is actuated, said valve means including a cylinder and cooperating piston element, said cylinder having a plurality of ports pierced in the walls thereof and said piston having a plurality of channels formed therein and registerable with the ports in the cylinder, said valve means serving to conduct fluid from said pressure producing means to a pressure chamber, and an outlet from said pressure chamber connected to the hydraulic wheel brakes of the vehicle whereby said brakes can be actuated by the fluid pressure established as aforesaid.

3. Apparatus for actuating hydraulic wheel brakes independently of the prime mover in a power driven vehicle comprising means for supplying a fluid under pressure, including a gear pump, means connected to said fluid pressure producing means and engageable with the free moving jack-shaft of said vehicle whereby said pressure producing means can be operated solely by momentum of the vehicle independently of the prime mover, valve means associated with said pressure producing means and simultaneously actuated when said connected means is actuated, said valve means including a cylinder and cooperating piston element, said cylinder having a plurality of ports pierced in the walls thereof and said piston having a plurality of channels formed therein and registerable with the ports in the cylinder, said valve means serving to conduct fluid from said pressure producing means to a pressure chamber, said pressure chamber comprising a cylinder having a plurality of ports connected to said valve means and a piston element slidably mounted therein and movable by means including the means actuating said valve means whereby the valve apparatus connected to said pressure chamber can be simultaneously closed and the piston element advanced thereby placing the fluid enclosed in said cylinder under a pressure greater than that produced by the aforesaid pressure producing means alone, and an outlet from said pressure chamber connected to the hydraulic wheel brakes of the vehicle whereby said brakes can be actuated by the fluid pressure established as aforesaid.

4. Apparatus for actuating hydraulic wheel brakes independently of the prime mover in a power driven vehicle comprising, means for supplying a fluid under pressure, means connected to said pressure producing means whereby said pressure producing means can be operated solely by momentum of the vehicle independently of the prime mover, valve means associated with said pressure producing means and serving to conduct fluid from said pressure producing means to a pressure chamber, said pressure chamber comprising a cylinder having a plurality of ports pierced in the walls thereof and connected to said valve means, and a piston element slidably mounted in said cylinder and movable by means including the means actuating said valve means whereby the valve ports connected to said pressure chamber can be simulaneously closed and the piston element advanced thereby placing the fluid enclosed in said cylinder under a pressure greater than that produced by the aforesaid pressure producing means alone, and an outlet from said pressure chamber connected to the hydraulic wheel brakes of the vehicle whereby said brakes can be actuated by the fluid pressure established as aforesaid.

JOSEPH B. MOORE.